(12) United States Patent
Dropps et al.

(10) Patent No.: US 7,512,067 B2
(45) Date of Patent: Mar. 31, 2009

(54) METHOD AND SYSTEM FOR CONGESTION CONTROL BASED ON OPTIMUM BANDWIDTH ALLOCATION IN A FIBRE CHANNEL SWITCH

(75) Inventors: Frank R. Dropps, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 699 days.

(21) Appl. No.: 10/894,536

(22) Filed: Jul. 20, 2004

(65) Prior Publication Data

US 2005/0018606 A1      Jan. 27, 2005

Related U.S. Application Data

(60) Provisional application No. 60/572,197, filed on May 18, 2004, provisional application No. 60/569,436, filed on May 7, 2004, provisional application No. 60/557,613, filed on Mar. 30, 2004, provisional application No. 60/550,250, filed on Mar. 4, 2004, provisional application No. 60/537,933, filed on Jan. 21, 2004, provisional application No. 60/532,967, filed on Dec. 29, 2003, provisional application No. 60/532,966, filed on Dec. 29, 2003, provisional application No. 60/532,965, filed on Dec. 29, 2003, provisional application No. 60/532,963, filed on Dec. 29, 2003, provisional application No. 60/505,381, filed on Sep. 23, 2003, provisional application No. 60/505,195, (Continued)

(51) Int. Cl.
*H04L 12/26* (2006.01)
(52) U.S. Cl. .................................. 370/230; 370/230.1

(58) Field of Classification Search ......... 370/229–230, 370/231–232, 233–234, 235–238, 455, 461
See application file for complete search history.

(56) References Cited

U.S. PATENT DOCUMENTS 4,081,612 A      3/1978   Hafner (Continued)

FOREIGN PATENT DOCUMENTS

EP         0649098          9/1994

(Continued)

OTHER PUBLICATIONS

International Preliminary Report on Patentability dated Apr. 3, 2007, for International patent application No. PCT/US2005/034844.

(Continued)

*Primary Examiner*—Kwang B. Yao
*Assistant Examiner*—Andrew Lai
(74) *Attorney, Agent, or Firm*—Klein, O'Neill & Singh, LLP

(57) ABSTRACT

A method and system for optimizing bandwidth allocation in a fiber channel network having a fiber channel switch element, is provided. The switch element includes, a port control module having a receive and transmit segment, wherein the transmit segment is programmed to block frame transmission from a particular frame source port for a certain duration based on a programmable threshold value. The method includes, enabling a bandwidth limitation counter; and programming the threshold value for blocking frame transmission from a frame source port for a certain duration and during this duration, other source ports may be chosen for frame transmission. After a frame is transmitted from a source port, a tag valid blocking from the same source port is used to block frame transmission. A quality of service register is used to store the threshold value and the threshold value is programmable.

11 Claims, 12 Drawing Sheets

Related U.S. Application Data filed on Sep. 23, 2003, provisional application No. 60/505,075, filed on Sep. 23, 2003, provisional application No. 60/504,950, filed on Sep. 19, 2003, provisional application No. 60/504,038, filed on Sep. 19, 2003, provisional application No. 60/503,812, filed on Sep. 19, 2003, provisional application No. 60/503,809, filed on Sep. 19, 2003, provisional application No. 60/495,212, filed on Aug. 14, 2003, provisional application No. 60/495,165, filed on Aug. 14, 2003, provisional application No. 60/488,757, filed on Jul. 21, 2003.

U.S. PATENT DOCUMENTS

| Patent No. | | Date | Inventor | Class |
|---|---|---|---|---|
| 4,162,375 | A | 7/1979 | Schilichte | 179/15 |
| 4,200,929 | A | 4/1980 | Davidjuk et al. | |
| 4,258,418 | A | 3/1981 | Heath | |
| 4,344,132 | A | 8/1982 | Dixon et al. | |
| 4,382,159 | A | 5/1983 | Bowditch | |
| 4,425,640 | A | 1/1984 | Philip et al. | 370/58 |
| 4,546,468 | A | 10/1985 | Christmas et al. | 370/54 |
| 4,569,043 | A | 2/1986 | Simmons et al. | 370/63 |
| 4,691,296 | A | 9/1987 | Struger | |
| 4,716,561 | A | 12/1987 | Angell et al. | |
| 4,725,835 | A | 2/1988 | Schreiner et al. | 340/825.83 |
| 4,821,034 | A | 4/1989 | Anderson et al. | 340/825 |
| 4,860,193 | A | 8/1989 | Bentley et al. | |
| 4,980,857 | A | 12/1990 | Walter et al. | |
| 5,025,370 | A | 6/1991 | Koegel et al. | |
| 5,051,742 | A | 9/1991 | Hullett et al. | |
| 5,090,011 | A | 2/1992 | Fukuta et al. | |
| 5,115,430 | A | 5/1992 | Hahne et al. | |
| 5,144,622 | A | 9/1992 | Takiyasu et al. | 370/85.13 |
| 5,260,933 | A | 11/1993 | Rouse | |
| 5,260,935 | A | 11/1993 | Turner | |
| 5,339,311 | A | 8/1994 | Turner | |
| 5,367,520 | A | 11/1994 | Cordell | 370/60 |
| 5,390,173 | A | 2/1995 | Spinney et al. | |
| 5,537,400 | A | 7/1996 | Diaz et al. | |
| 5,568,165 | A | 10/1996 | Kimura | |
| 5,590,125 | A * | 12/1996 | Acampora et al. | 370/397 |
| 5,594,672 | A | 1/1997 | Hicks | |
| 5,598,541 | A | 1/1997 | Malladi | 395/286 |
| 5,610,745 | A | 3/1997 | Bennett | 359/139 |
| 5,623,492 | A | 4/1997 | Teraslinna | |
| 5,666,483 | A | 9/1997 | McClary | |
| 5,677,909 | A | 10/1997 | Heide | |
| 5,687,172 | A | 11/1997 | Cloonan et al. | 370/395 |
| 5,701,416 | A | 12/1997 | Thorson et al. | |
| 5,706,279 | A | 1/1998 | Teraslinna | |
| 5,732,206 | A | 3/1998 | Mendel | |
| 5,748,612 | A | 5/1998 | Stoevhase et al. | 370/230 |
| 5,764,927 | A | 6/1998 | Murphy et al. | |
| 5,768,271 | A | 6/1998 | Seid et al. | |
| 5,768,533 | A | 6/1998 | Ran | |
| 5,784,358 | A | 7/1998 | Smith et al. | |
| 5,790,545 | A | 8/1998 | Holt et al. | |
| 5,790,840 | A | 8/1998 | Bulka et al. | |
| 5,812,525 | A | 9/1998 | Teraslinna | |
| 5,818,842 | A | 10/1998 | Burwell et al. | 370/397 |
| 5,821,875 | A | 10/1998 | Lee et al. | |
| 5,822,300 | A | 10/1998 | Johnson et al. | |
| 5,825,748 | A | 10/1998 | Barkey et al. | |
| 5,828,475 | A | 10/1998 | Bennett et al. | |
| 5,835,752 | A | 11/1998 | Chiang et al. | |
| 5,850,386 | A | 12/1998 | Anderson et al. | |
| 5,936,442 | A | 8/1999 | Liu et al. | |
| 5,937,169 | A | 8/1999 | Connery et al. | |
| 5,954,796 | A | 9/1999 | McCarty et al. | |
| 5,974,547 | A | 10/1999 | Klimenko | |
| 5,978,359 | A | 11/1999 | Caldara et al. | |
| 5,978,379 | A | 11/1999 | Chan et al. | |
| 5,987,028 | A | 11/1999 | Yang et al. | 370/380 |
| 5,999,528 | A | 12/1999 | Chow et al. | 370/365 |
| 6,011,779 | A | 1/2000 | Wills | |
| 6,014,383 | A | 1/2000 | McCarty | 370/453 |
| 6,021,128 | A | 2/2000 | Hosoya et al. | 370/380 |
| 6,026,092 | A | 2/2000 | Abu-Amara et al. | |
| 6,031,842 | A | 2/2000 | Trevitt et al. | |
| 6,046,979 | A | 4/2000 | Bauman | |
| 6,047,323 | A | 4/2000 | Krause | 709/227 |
| 6,055,618 | A | 4/2000 | Thorson | |
| 6,061,360 | A * | 5/2000 | Miller et al. | 370/455 |
| 6,081,512 | A | 6/2000 | Muller et al. | 370/256 |
| 6,108,738 | A | 8/2000 | Chambers et al. | |
| 6,108,778 | A | 8/2000 | LaBerge | |
| 6,128,292 | A | 10/2000 | Kim et al. | 370/356 |
| 6,134,127 | A | 10/2000 | Kirchberg | |
| 6,151,644 | A | 11/2000 | Wu | |
| 6,160,813 | A | 12/2000 | Banks et al. | 370/422 |
| 6,185,203 | B1 | 2/2001 | Berman | |
| 6,201,787 | B1 | 3/2001 | Baldwin et al. | |
| 6,209,089 | B1 | 3/2001 | Selitrennikoff et al. | |
| 6,229,822 | B1 | 5/2001 | Chow et al. | |
| 6,230,276 | B1 | 5/2001 | Hayden | |
| 6,240,096 | B1 | 5/2001 | Book | |
| 6,252,891 | B1 | 6/2001 | Perches | |
| 6,253,267 | B1 | 6/2001 | Kim et al. | |
| 6,289,002 | B1 | 9/2001 | Henson et al. | |
| 6,301,612 | B1 | 10/2001 | Selitrennikoff et al. | |
| 6,308,220 | B1 | 10/2001 | Mathur | 709/238 |
| 6,324,181 | B1 | 11/2001 | Wong et al. | 370/403 |
| 6,330,236 | B1 | 12/2001 | Ofek et al. | 370/369 |
| 6,333,932 | B1 | 12/2001 | Kobayasi et al. | |
| 6,335,935 | B2 | 1/2002 | Kadambi et al. | |
| 6,389,479 | B1 | 5/2002 | Boucher et al. | |
| 6,401,128 | B1 | 6/2002 | Stai et al. | |
| 6,411,599 | B1 | 6/2002 | Blanc et al. | 370/219 |
| 6,411,627 | B1 * | 6/2002 | Hullett et al. | 370/398 |
| 6,418,477 | B1 | 7/2002 | Verma | |
| 6,421,342 | B1 | 7/2002 | Schwartz et al. | |
| 6,421,711 | B1 | 7/2002 | Blumenau et al. | |
| 6,424,658 | B1 | 7/2002 | Mathur | 370/429 |
| 6,438,628 | B1 * | 8/2002 | Messerly et al. | 710/35 |
| 6,449,274 | B1 | 9/2002 | Holden et al. | 370/392 |
| 6,452,915 | B1 | 9/2002 | Jorgensen | |
| 6,467,008 | B1 | 10/2002 | Gentry et al. | 710/261 |
| 6,470,026 | B1 | 10/2002 | Pearson et al. | |
| 6,522,656 | B1 | 2/2003 | Gridley | |
| 6,532,212 | B1 | 3/2003 | Soloway et al. | |
| 6,570,850 | B1 | 5/2003 | Gutierrez et al. | |
| 6,570,853 | B1 | 5/2003 | Johnson et al. | |
| 6,594,231 | B1 | 7/2003 | Byham et al. | |
| 6,597,691 | B1 | 7/2003 | Anderson et al. | 370/360 |
| 6,606,690 | B2 | 8/2003 | Padovano | |
| 6,614,796 | B1 | 9/2003 | Black et al. | |
| 6,622,206 | B1 | 9/2003 | Kanamaru et al. | |
| 6,657,962 | B1 | 12/2003 | Barri et al. | |
| 6,684,209 | B1 | 1/2004 | Ito et al. | |
| 6,697,359 | B1 | 2/2004 | George | 370/357 |
| 6,697,368 | B2 | 2/2004 | Chang et al. | |
| 6,718,497 | B1 | 4/2004 | Whitby-Strevens | |
| 6,738,381 | B1 | 5/2004 | Agnevik et al. | |
| 6,744,772 | B1 | 6/2004 | Eneboe et al. | |
| 6,779,083 | B1 | 8/2004 | Ito et al. | |
| 6,785,241 | B1 | 8/2004 | Lu et al. | |
| 6,807,181 | B1 | 10/2004 | Weschler | |
| 6,816,492 | B1 | 11/2004 | Turner et al. | |
| 6,816,750 | B1 | 11/2004 | Klaas | |
| 6,859,435 | B1 | 2/2005 | Lee et al. | |
| 6,865,157 | B1 | 3/2005 | Scott et al. | |
| 6,901,072 | B1 | 5/2005 | Wong | |
| 6,934,799 | B2 | 8/2005 | Acharya et al. | |

| | | |
|---|---|---|
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,985 B2 | 6/2007 | Hahn et al. |
| 7,245,613 B1 | 7/2007 | Winkles et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,131 B2 | 9/2007 | Cashman et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,352,740 B2 | 4/2008 | Hammons et al. |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. ............... 370/392 |
| 2001/0043564 A1 | 11/2001 | Bloch et al. |
| 2001/0047460 A1 | 11/2001 | Kobayashi et al. |
| 2002/0016838 A1 | 2/2002 | Geluc et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0122428 A1 | 9/2002 | Fan et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2003/0002503 A1 | 1/2003 | Brewer et al. |
| 2003/0016683 A1 | 1/2003 | George et al. |
| 2003/0021239 A1 | 1/2003 | Mullendore et al. |
| 2003/0026267 A1* | 2/2003 | Oberman et al. ............ 370/397 |
| 2003/0026287 A1 | 2/2003 | Mullendore et al. |
| 2003/0035433 A1 | 2/2003 | Craddock et al. |
| 2003/0046396 A1 | 3/2003 | Richter et al. |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0093607 A1 | 5/2003 | Main et al. |
| 2003/0103451 A1 | 6/2003 | Lutgen et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 | 10/2003 | Westby |
| 2003/0218986 A1 | 11/2003 | DeSanti et al. |
| 2003/0229808 A1 | 12/2003 | Heintz et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Forbes |
| 2004/0024831 A1 | 2/2004 | Yang et al. |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ..................... 370/463 |
| 2004/0151188 A1 | 8/2004 | Maveli et al. |
| 2004/0153526 A1 | 8/2004 | Haun et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |

| | | | |
|---|---|---|---|
| 2006/0034302 A1 | 2/2006 | Peterson | |
| 2006/0047852 A1 | 3/2006 | Shah et al. | |
| 2006/0074927 A1 | 4/2006 | Sullivan et al. | |
| 2006/0107260 A1 | 5/2006 | Motta | |
| 2006/0143300 A1 | 6/2006 | See et al. | |
| 2006/0184711 A1 | 8/2006 | Pettey | |
| 2006/0203725 A1 | 9/2006 | Paul et al. | |
| 2006/0274744 A1 | 12/2006 | Nagai et al. | |
| 2007/0206502 A1 | 9/2007 | Martin et al. | |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

International Preliminary Report on Patentability dated Apr. 3, 2007, for International patent application No. PCT/US2005/034758.

International Preliminary Report on Patentability dated Apr. 11, 2007, for International patent application No. PCT/US2005/034845.

International Preliminary Report on Patentability dated Apr. 3, 2007, for International patent application No. PCT/US2005/035064.

International Preliminary Report on Patentability dated Jul. 24, 2007, for International patent application No. PCT/US2005/42528.

Brown, Douglas W., "A State-Machine Synthesizer", *18th Design Automation Conference*, (1981),301-305.

"Deliver Server-Free Backup", *Pathlight & Computer Associates*, White Paper of Apr. 2000, Ithaca, New York, XP-002381153, 1-8.

Naik, D., "Inside Windows Storage:Server Storage Technologies for Windows 2000, Windows Server 2003 and Beyond", *Addison-Wesley*, US, Chapter 5, XP-002381152. (Jul. 15, 2003),137-173.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics", T11/03-352v0, May 2003; pp. 1-4.

Martin et al, "Virual Channel Architecture", Presentation by Brocade to T11/03-369V0 dated Jun. 2, 2003.

"Office Action from USPTO dated Apr. 4, 2008 for U.S. Appl. No. 10/957,465".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Office Action from USPTO dated Apr. 14, 2008 for U.S. Appl. No. 10/894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Final Office Action from USPTO dated Apr. 1, 2008 for U.S. Appl. No. 10/956,717".

"Office Action from USPTO dated Apr. 3, 2008 for U.S. Appl. No. 10/894,587".

"Notice of Allowance from USPTO dated Apr. 4, 2008 for U.S. Appl. No. 11/608,634".

"Final Office Action from USPTO dated Apr. 29, 2008 for U.S. Appl. No. 10/894,491".

"Office Action from USPTO dated May 2, 2008 for U.S. Appl. No. 11/037,922".

"Final Office Action from USPTO dated May 12, 2008 for U.S. Appl. No. 10/894,492".

"Office Action from USPTO dated May 14, 2008 for U.S. Appl. No. 10/956,502".

"Office Action from USPTO dated May 15, 2008 for U.S. Appl. No. 10/798,527".

"Final Office Action from USPTO dated May 21, 2008 for U.S. Appl. No. 10/889,635".

"Office Action from USPTO dated Mar. 20, 2008 for U.S. Appl. No. 10/894,732".

"Office Action for USPTO dated Jun. 27, 2008 for U.S. Appl. No. 10/894,726".

"Final Office Action from USPTO dated Jun. 4, 2008 for U.S. Appl. No. 10/894,978".

"Final Office Action from USPTO dated Jun. 5, 2008 for U.S. Appl. No. 10/889,267".

"Final Office Action from USPTO dated Jun. 10, 2008 for U.S. Appl. No. 10/894,586".

"Office Action from USPTO dated Jun. 25, 2008 for U.S. Appl. No. 10/895,175".

"Notice of Allowance from USPTO dated Jun. 25, 2008 for U.S. Appl. No. 10/894,491".

"Notice of Allowance from USPTO dated Jun. 27, 2008 for U.S. Appl. No. 10/956,717".

"Office Action from USPTO dated Jun. 26, 2008 for U.S. Appl. No. 10/894,547".

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

"Office Action from USPTO dated Sep. 6, 2007 for U.S. Appl. No. 10/889,337".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".
"Office Action from USPTO dated Jan. 9, 2008 for U.S. Appl. No. 10/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Mar. 5, 2008 for U.S. Appl. No. 10/889,259".
"Office Action from USPTO dated Mar. 7, 2008 for U.S. Appl. No. 10/894,629".
"Examination Report from the European Patent Office dated Oct. 12, 2007 for European Application No. 05 805 632.6".
"Office Action from USPTO dated Mar. 21, 2006 for U.S. Appl. No. 10/889,588".
"Office Action from USPTO dated Aug. 31, 2007 for U.S. Appl. No. 10/889,635".
Malavalli, et al., "Fibre Channel Framing and Signaling (FC-FS) Rev 1.10", *NCITS working draft proposed American National Standard for Information Technology*, (Jan. 25, 2001).
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".

* cited by examiner

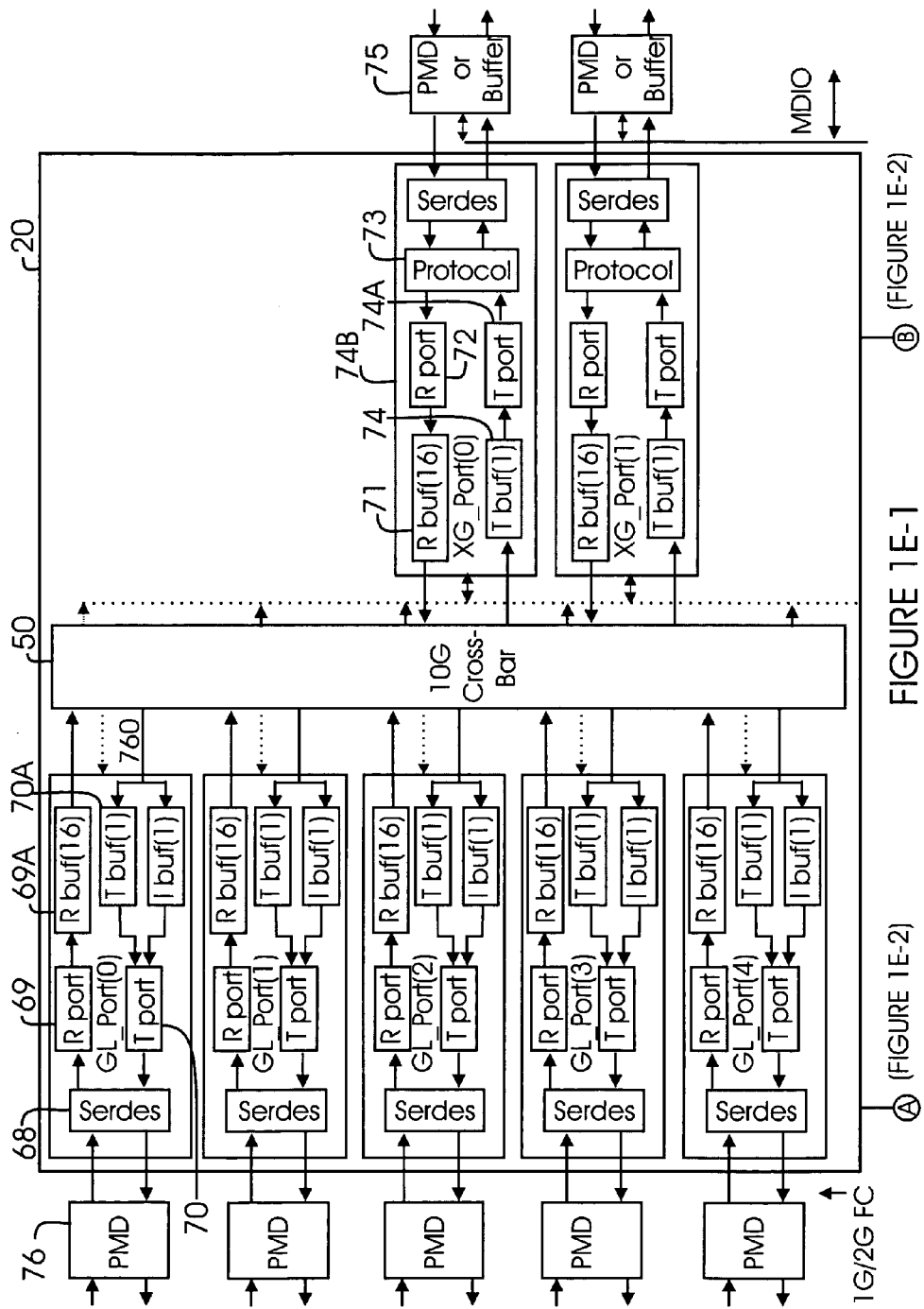

METHOD AND SYSTEM FOR CONGESTION CONTROL BASED ON OPTIMUM BANDWIDTH ALLOCATION IN A FIBRE CHANNEL SWITCH

CROSS REFERENCE TO RELATED APPLICATIONS

This application claims priority under 35 U.S.C.§ 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to congestion control by using a bandwidth-limiting feature for frame transmission in a fibre channel switch.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Fibre Channel switch fabrics can have arbitrary topologies and a mixture of frame traffic where frame source (s) and destinations operate at different speeds. Quality of service and congestion management is desirable to optimize switch performance.

In Fibre Channel, buffer-to-buffer credit mechanism is used to control frame flow on a Fibre Channel link to prevent the inability to deliver any frames because of lost R_RDYs or lost frames. The R_RDY primitive is used to indicate whether a receive port has credit to receive frames.

FIG. 2 illustrates the congestion problem in conventional fibre channel switches. In FIG. 2, Host 201 sends data to target 207 and host 202 sends data to target 208, via switches 203 and 206 having ports 204 and 205. Target 208 link operates at 1 gigabit/second and all other links operate at higher rates (for example, 2 Gb/S, 4 Gb/S, 8 Gb/S or 10 Gb/s.

If both host 201 and 202 send data as fast as they can, then eventually all receive buffers in port 205 will get filled up with frames destined for target 208, which in this example operates at the slowest speed compared to the other links. Hence port 204 will not be able to transmit at its bandwidth and cause congestion in the overall system.

The present fibre channel switches and standard do not provide a mechanism where bandwidth limitation is used as a feature to stagger frame transmission. Therefore, there is a need for a system and method that allows congestion control bandwidth limitation of source and transmit ports.

SUMMARY OF THE PRESENT INVENTION

In one aspect of the present invention, a method for optimizing bandwidth allocation in a fibre channel network having a fibre channel switch element, is provided. The method includes, enabling a bandwidth limitation counter; and programming a threshold value for blocking frame transmission from a frame source port for a certain duration and during this duration, other source ports may be chosen for frame transmission.

After a frame is transmitted from a source port, a tag valid blocking from the same source port is used to block frame transmission. A quality of service register is used to store the threshold value and the threshold value is programmable.

In yet another aspect of the present invention, a fibre channel switch element is provided. The switch element includes, a port control module having a receive and transmit segment, wherein the transmit segment is programmed to block frame transmission from a particular frame source port for a certain duration based on a programmable threshold value.

In yet another aspect of the present invention, a system for optimizing bandwidth location in a fibre channel network having a fibre channel switch element, is provided. The system includes, a register for storing a threshold value that is compared to a counter value, which determines whether a particular frame source port should be blocked.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.—Port or F. Sub.—Port.

"L_Port": A port that contains Arbitrated Loop functions associated with the Arbitrated Loop topology.

"N-Port": A direct fabric attached port.

"NL_Port": A L_Port that can perform the function of a N_Port.

"R_RDY": Flow control primitive signal used for establishing credit. Receiving an R_RDY frame increases credit, while sending a R_RDY frame decreases credit.

"Switch": A fabric element conforming to the Fibre Channel Switch standards.

"VL" (Virtual Lane): A dedicated portion of the data path between a source and destination port each having independent buffer to buffer flow control.

"VC_RDY": Primitive for establishing credit if the switch uses virtual lanes.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
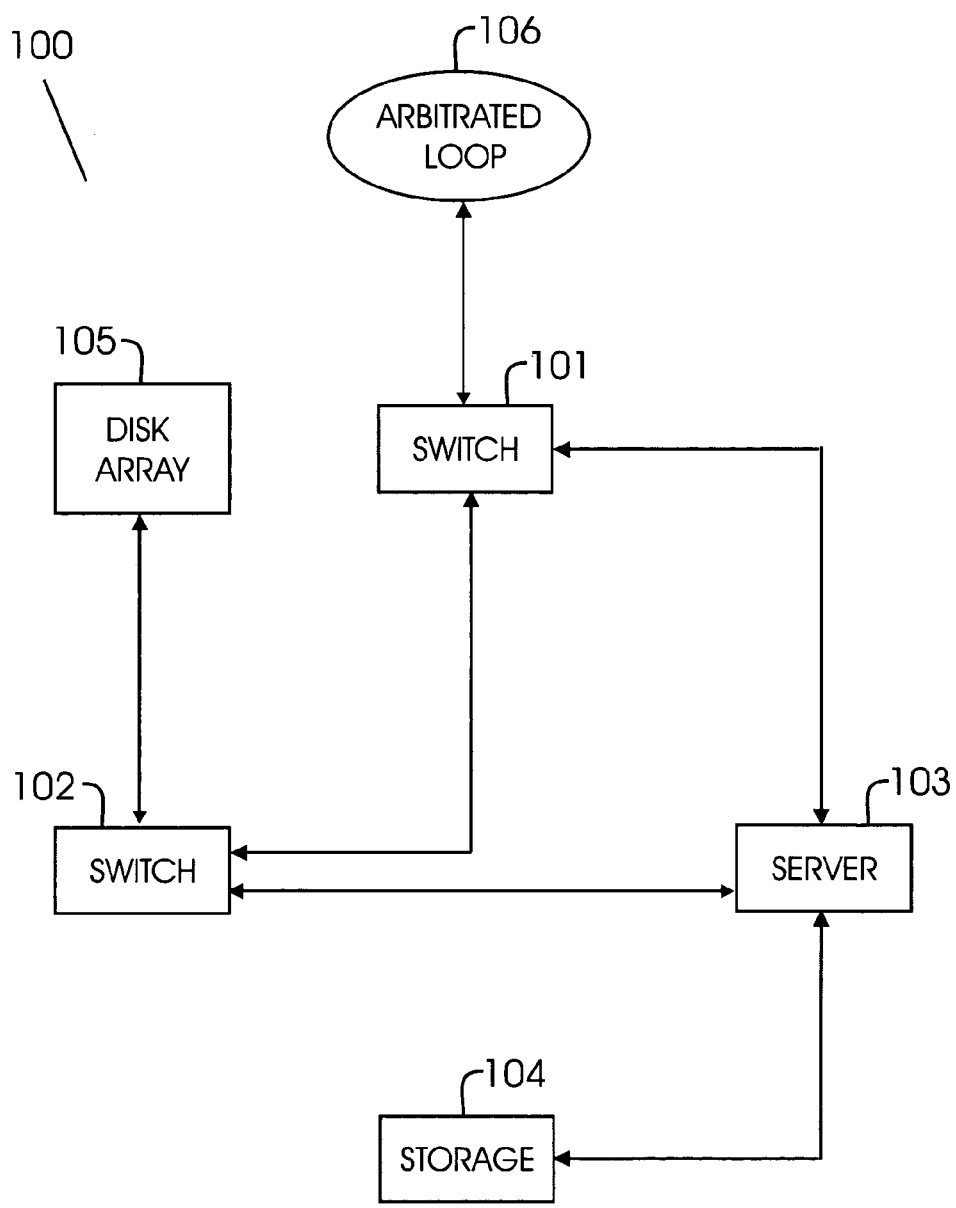
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
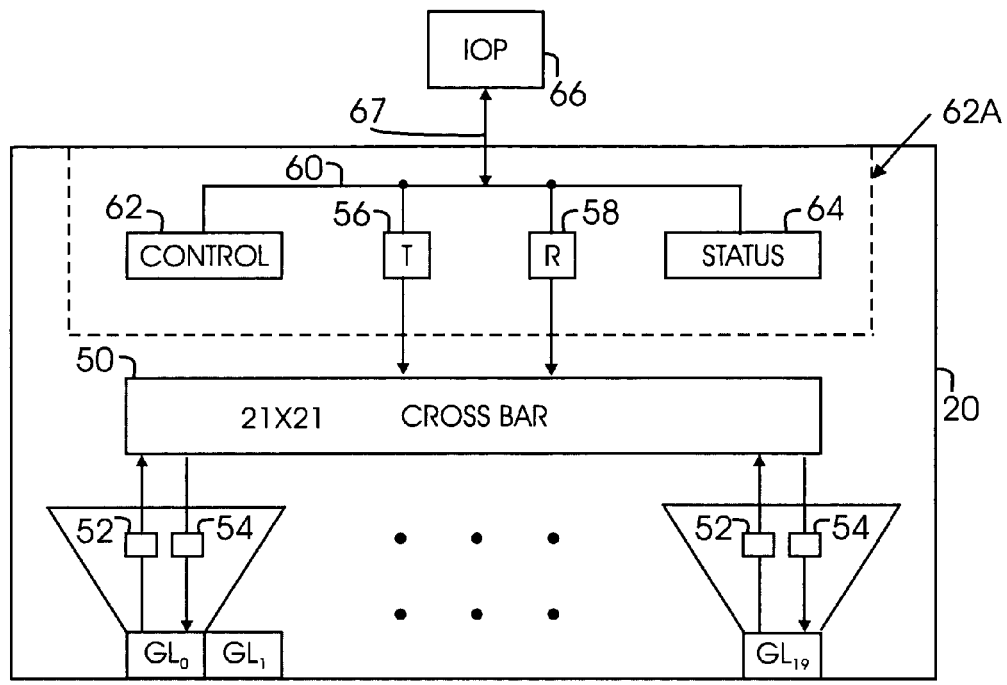
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
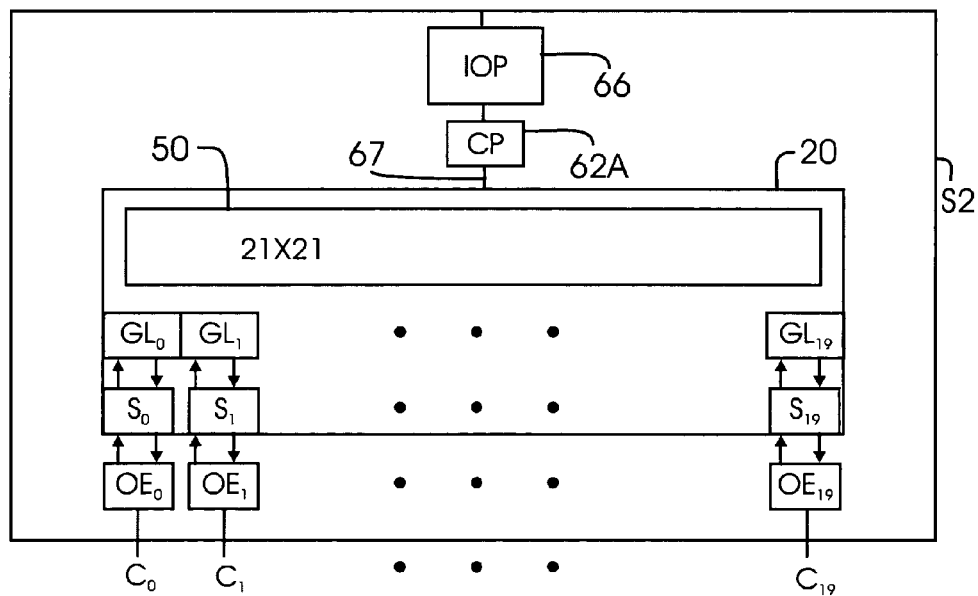
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
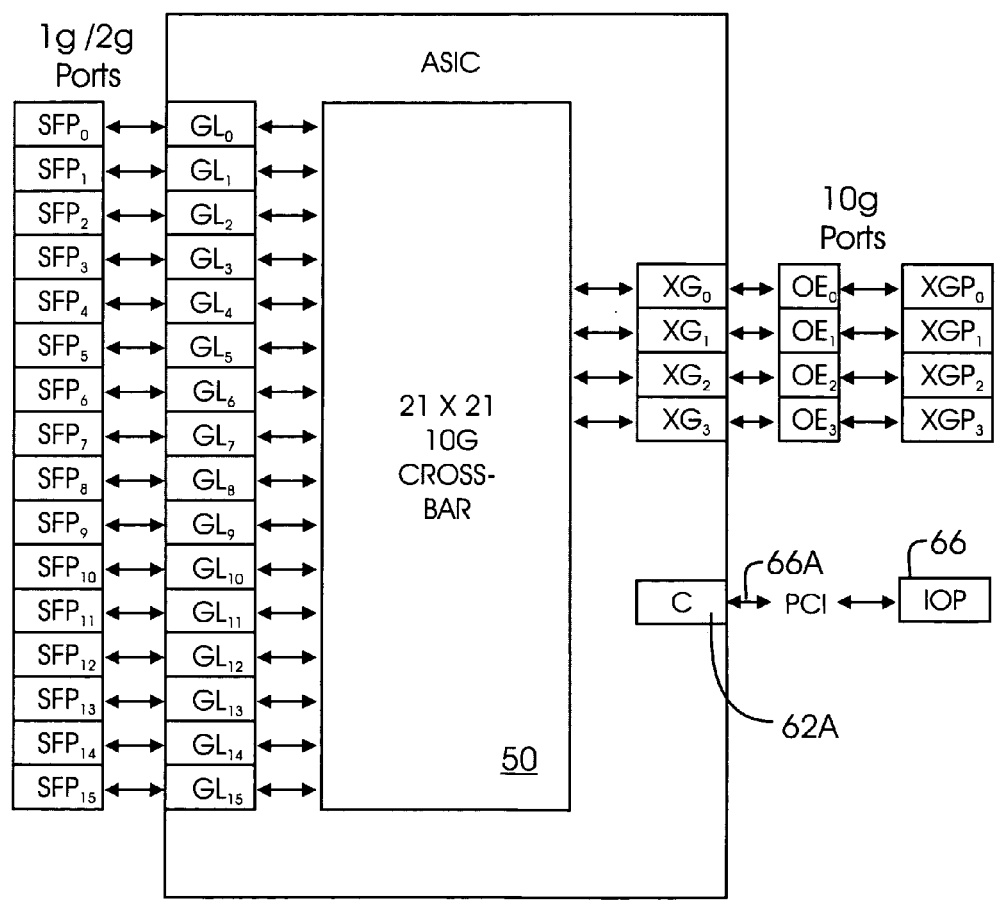
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figures 1, 1E, 2:
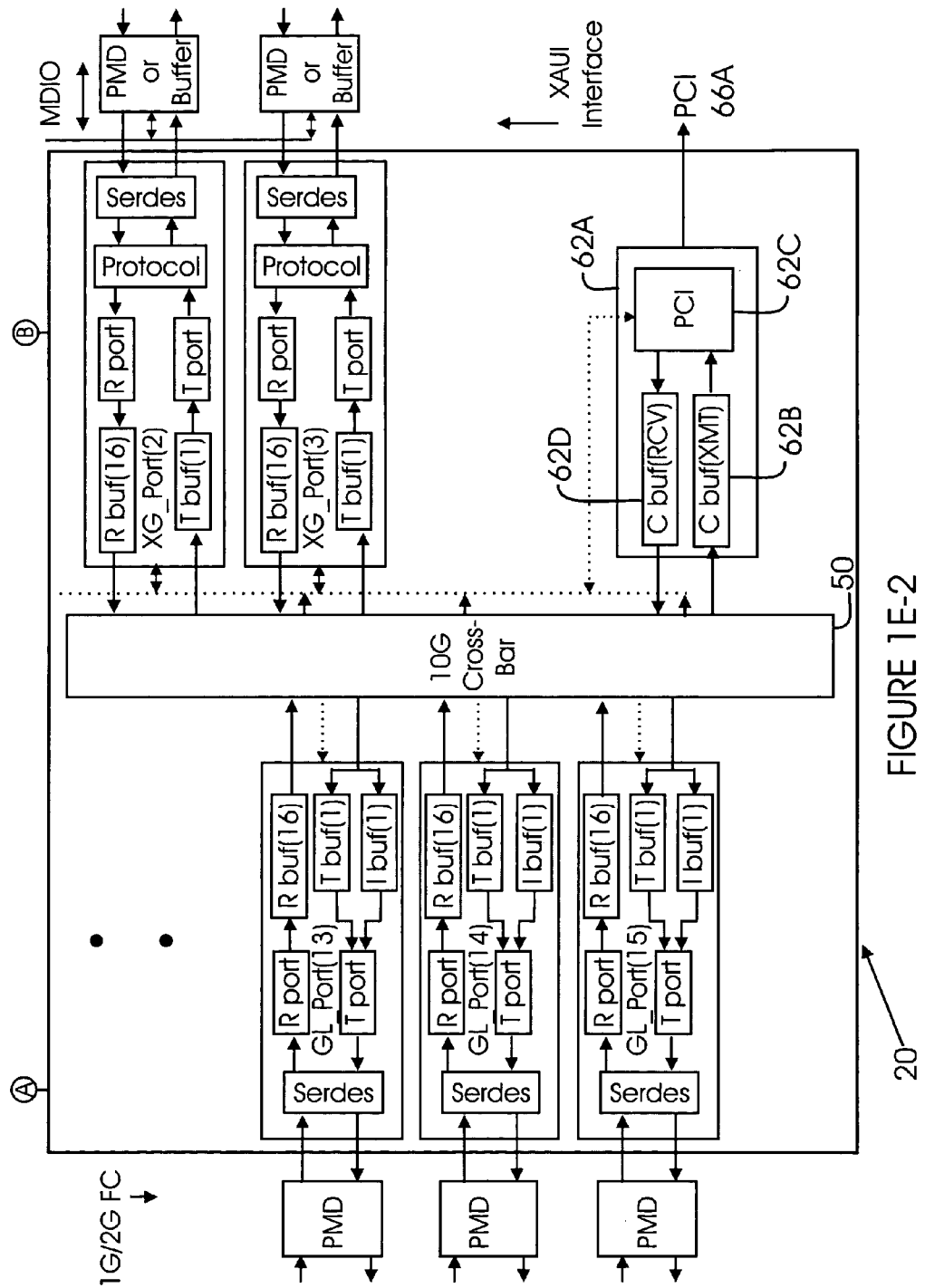
FIGS. 1E-1/1E-2 (jointly referred to as FIG. 1E) show another block diagram of a Fibre Channel switch element with sixteen GL_Ports and four 10 G ports, according to one aspect of the present invention.
FIG. 2 is a block diagram of a system to illustrate congestion.
Figure 2:
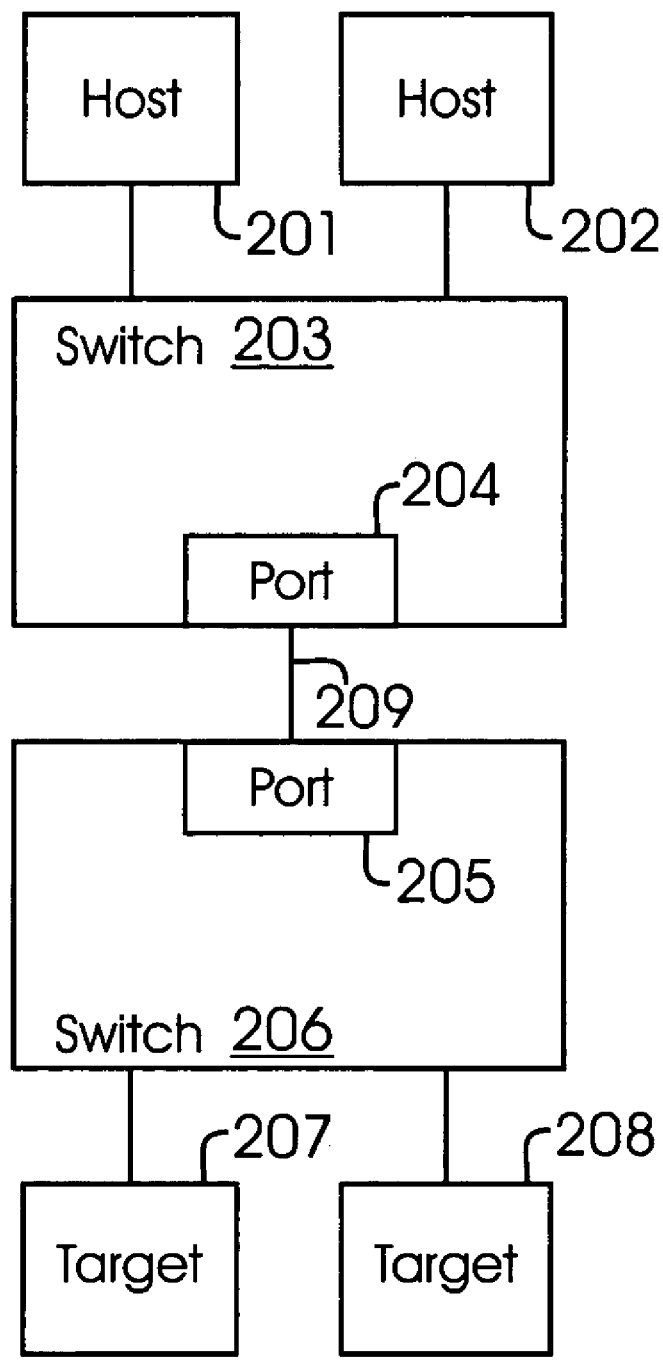

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
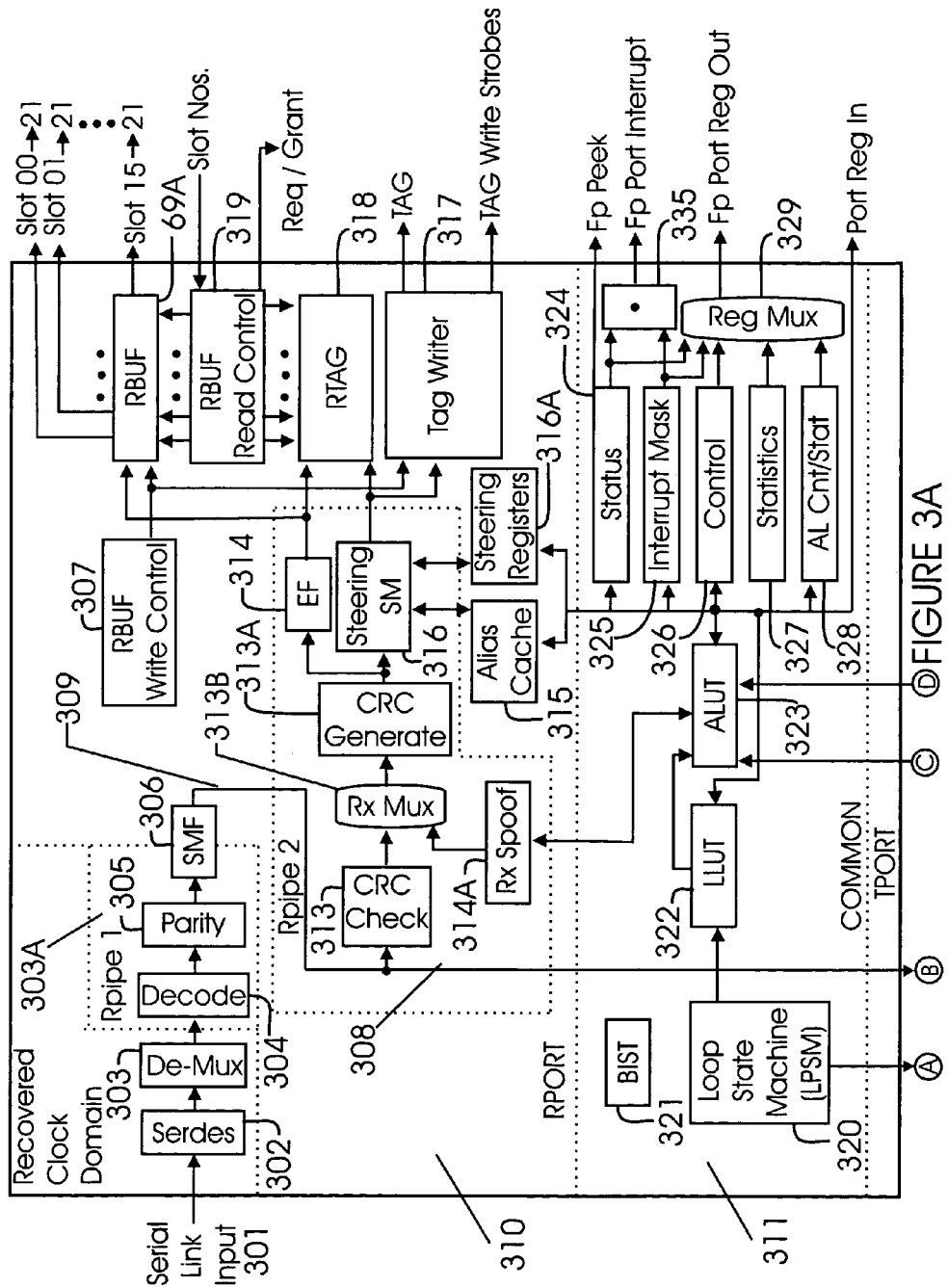
FIGS. 3A/3B (jointly referred to as FIG. 3) show a block diagram of a GL_Port, according to one aspect of the present invention.
Figure 3B:
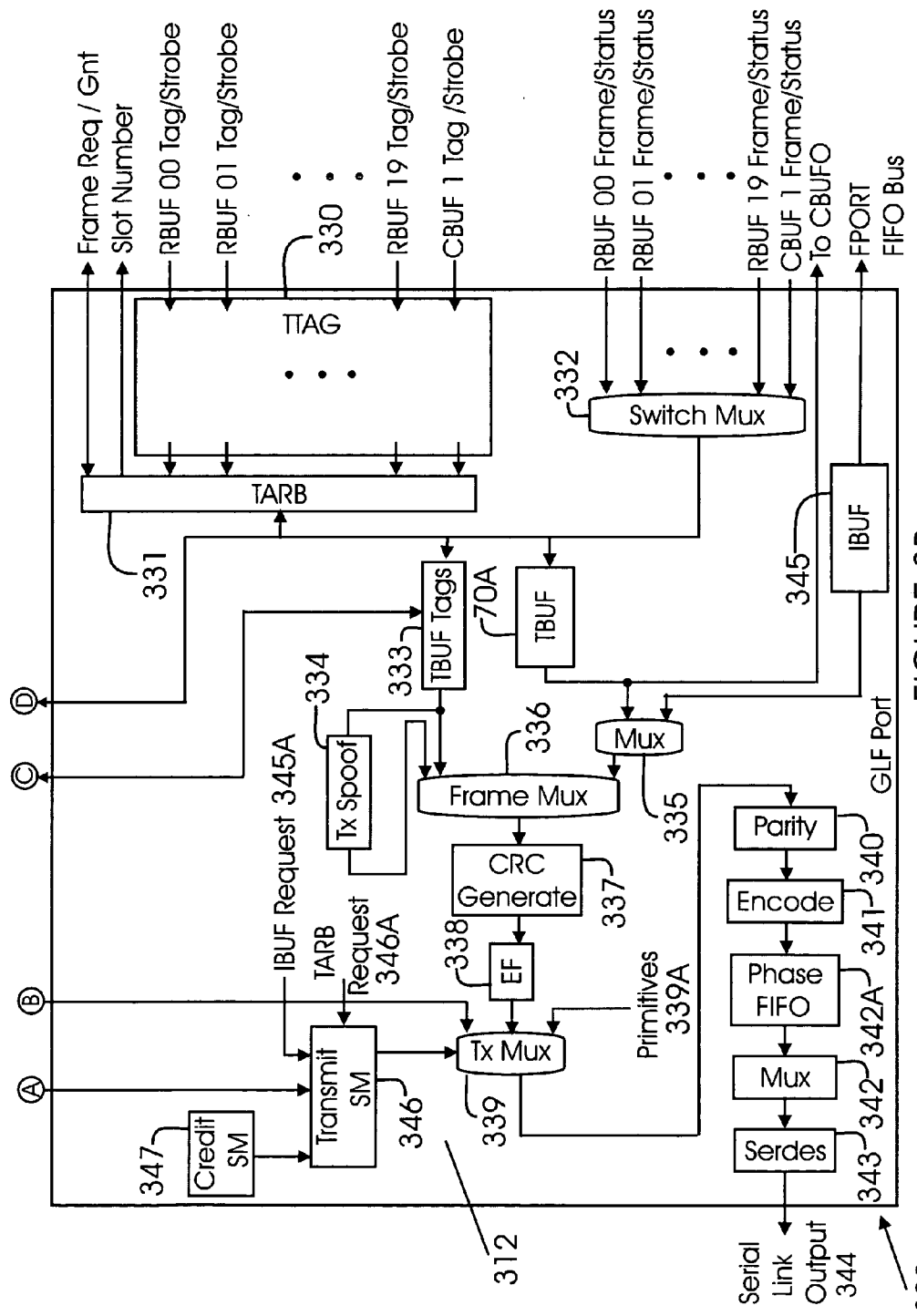

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" may also be referred to as "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer("Mux") 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port: As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
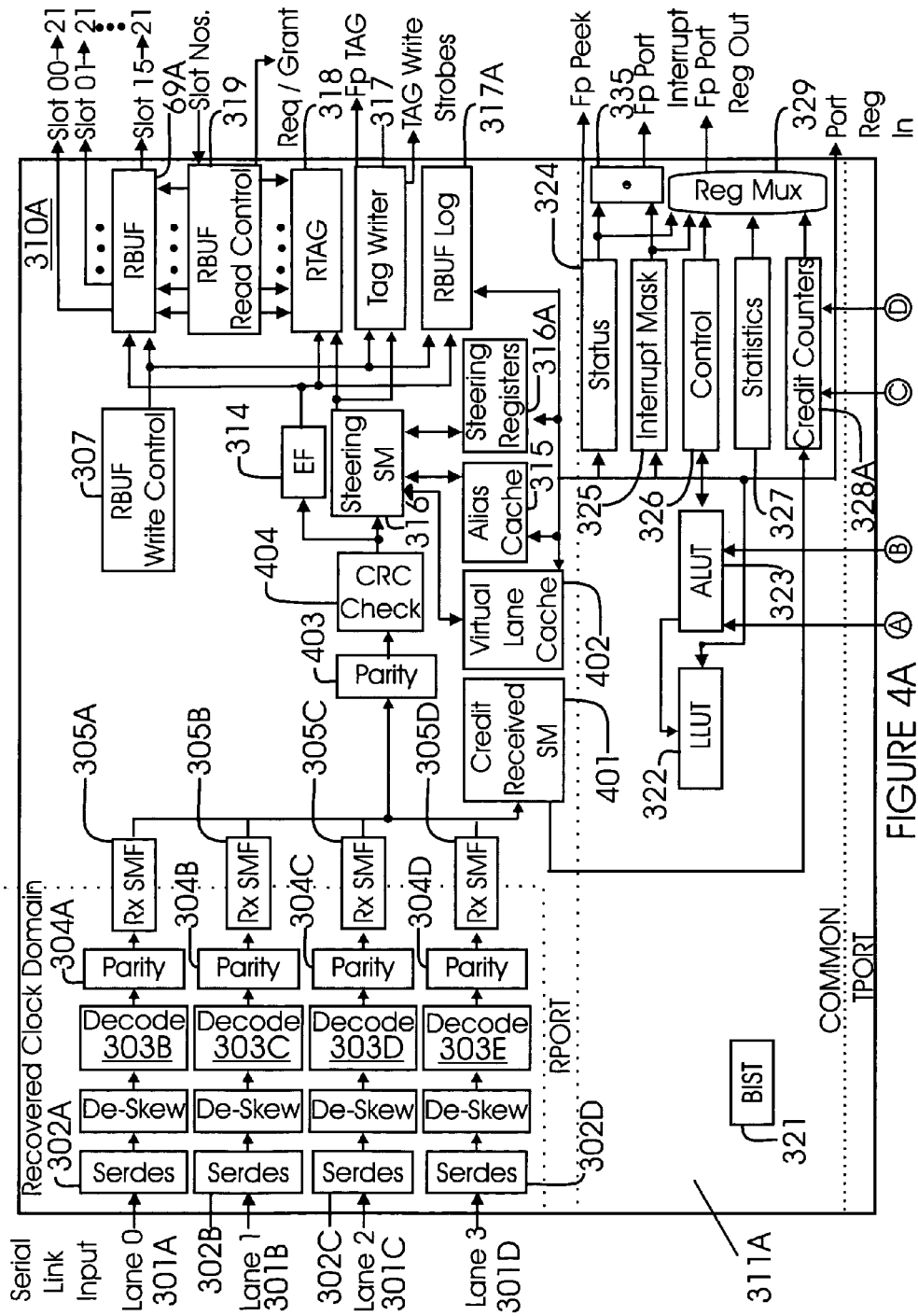
FIGS. 4A/4B (jointly referred to as FIG. 3) show a block diagram of XG_Port (10 G) port, according to one aspect of the present invention.
Figure 4B:
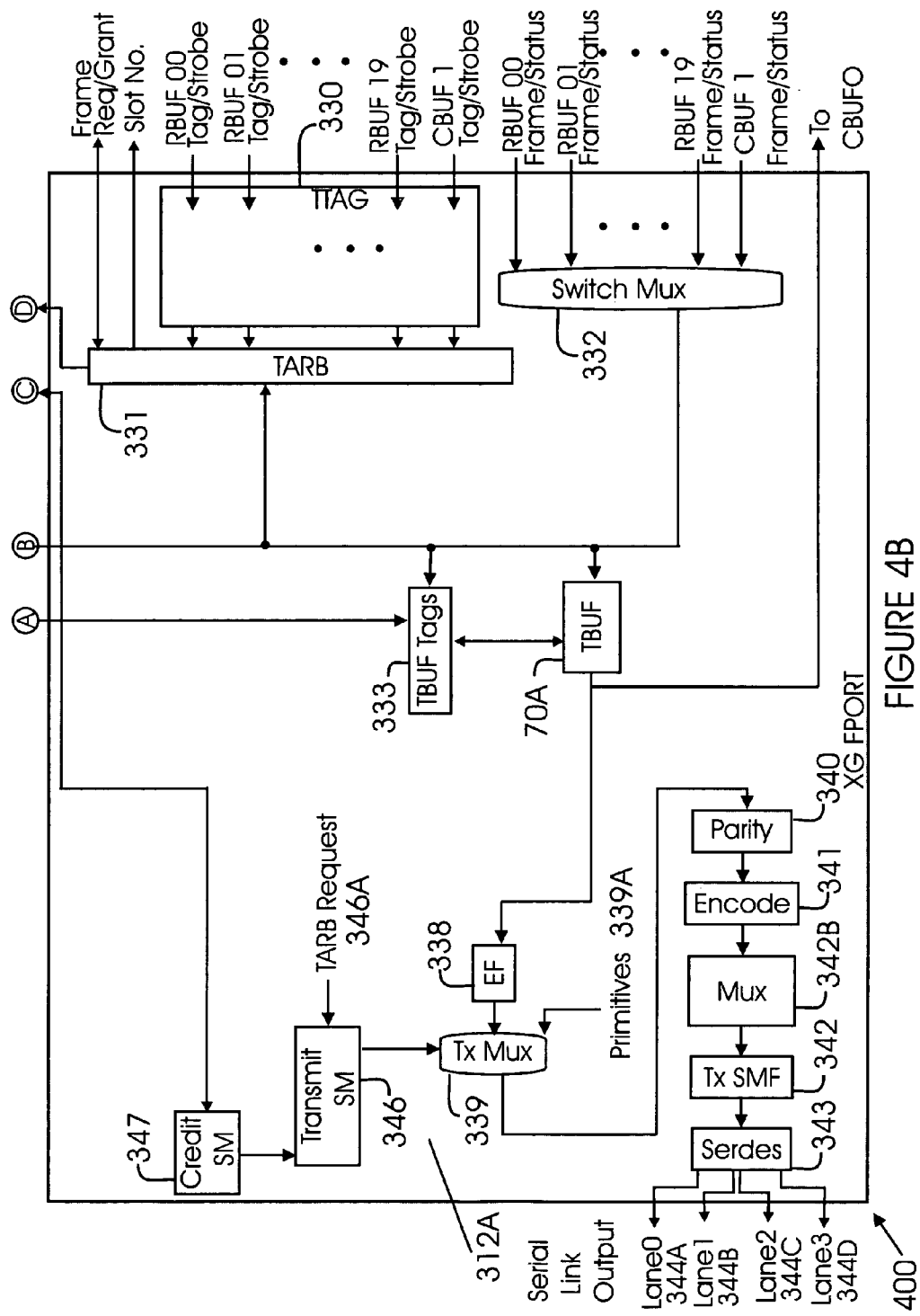

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing ("TxSMF") module 342 that handles clock variation on the transmit side. SERDES 343 then sends the data out to the link.

Bandwidth Limiting Feature:

In one aspect of the present invention, bandwidth-limiting logic located in TTAG 330 minimizes congestion so frames are transferred from a port based on optimum bandwidth of the link. TTAG 330 includes information for every frame in ASIC 20 that is destined to a particular port. TTAG 330 includes a "valid" bit that denotes available frames from a particular source port destined to the transmit port. As discussed above, each TTAG 330 has a FIFO for every source port. The bandwidth limiting logic, according to one aspect of the present invention blocks the valid bit that feeds into TARB 331 for a fraction of time. This will limit frame traffic from one of the source ports as described below, which reduces congestion.

In one aspect of the present invention, a transmit queue in TTAG 330 (in TPORT 312A and/or 311) uses a Quality of Service (QOS) register 503 (FIG. 5) that can be programmed by IOP 66 to enable frame transmission based on the innovative bandwidth limiting feature of the present invention. When used for bandwidth limiting, as described below, the QOS register 503 can be programmed with a threshold value that each queue has to wait after a frame transfer before the next frame is selected from it.

Figure 5:
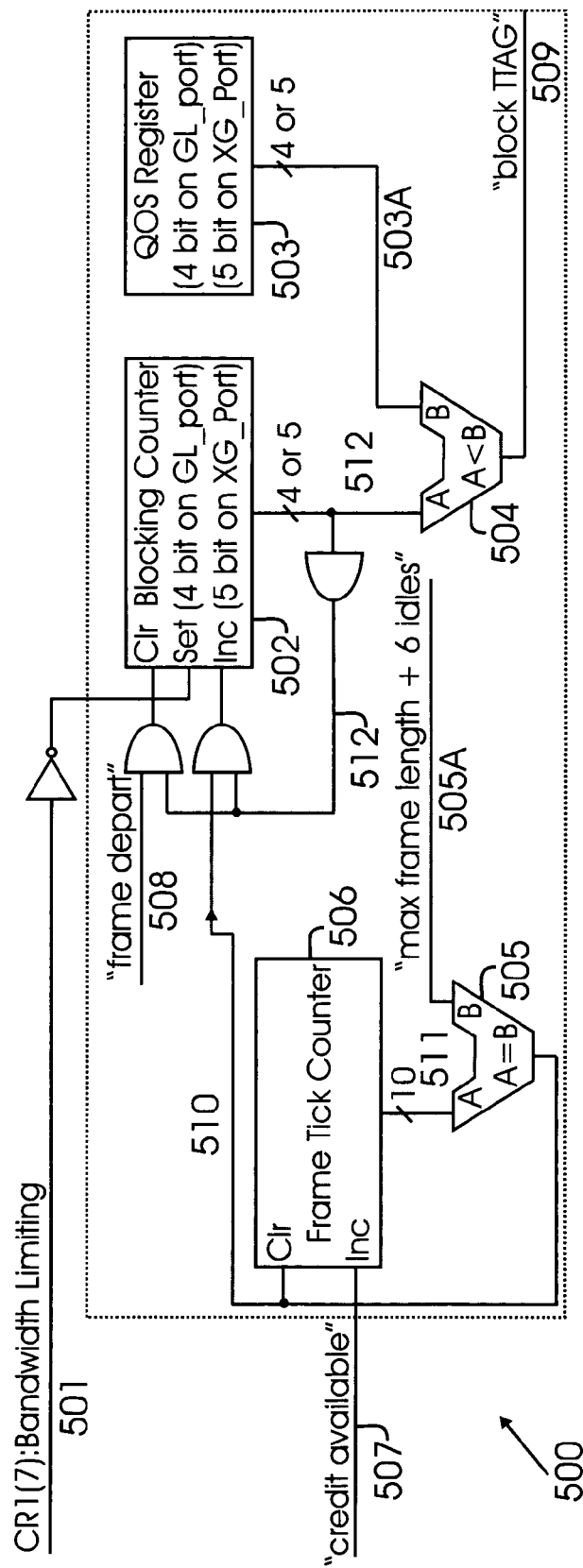
FIG. 5 shows a schematic for using bandwidth limitation as a parameter to avoid frame congestion in a fibre channel switch, according to one aspect of the present invention.

FIG. 5 shows a schematic of logic 500 that is used for using bandwidth limitation as a parameter to avoid frame congestion in a fibre channel switch. Logic 500 illustrates the adaptive aspects of the present invention but is not intended to limit the present invention to the logic scheme itself.

Bandwidth limiting is enabled by signal 501 that is based on a bit value set in control register 326. IOP 66 can set this bit value. Firmware running on IOP 66 controls the bit value for signal 501.

The appropriate time to block or pass the "valid" bit to TARB 331 is determined by using two counters, 506 and 502. Counter 506 counts the amount of time to pass a full-length frame (for example, 537 words) (signal 505A to logic 505). Counter 506 adjusts the transmit rate control bit to always count the maximum plus a certain value, for example, six words (for inter-frame gap IDLES), shown as signal 505A. When this value is achieved (A=B, in logic 505, where A is the counter value 511 and B is 505A), counter 506 is cleared and restarts counting again at zero. Signal 507 stops counter 506 from counting when no transmit credit is available thereby providing a smooth allocation of a link's bandwidth that is actually available for frame transfer.

Counter 502 counts from zero to a certain number X, for example, fifteen. The time it takes counter 502 to count to X equates to a certain number of frame lengths (for example, sixteen frame lengths if X is equal to 15), with minimum delay. Counter 502 is enabled by signal 501 and starts counting when it receives "frame depart" signal 508, denoting that the source port has completed frame transfer from TBUF 70A. Hence, in the foregoing example, if at any given time, the frame being transferred is a maximum length frame, then it will take X (for example, 16) frame times to increment counter 502 from 0 to X−1 (in this example, 0 to 15).

Counter 502 receives input 510 from logic 505, frame depart signal 508 and signal 512. Counter 502 is set inactive when signal 501 is inactive; this prevents TTAG 330 blocking when the feature is disabled. Counter 502 increments based on signal 510. Signal 508 is used to clear counter 502. Signal 512 prevents counter 502 from rolling over and holds counter 502 in a state that will allow a frame to be selected from a given source port until a frame is actually transmitted.

The time window of X frame times (sixteen frames, in this example) is the basis for regulating frame transfer rate from a particular source port. QOS register 503 can be programmed with a value that will indicate how many maximum frame time periods a source port should halt frame transfers within the maximum frame time cycle.

For the foregoing example of 16 frame times, QOS register 503 may be programmed to any threshold value from zero to fifteen to block frame transfers for a limited time. In one aspect, programming with a code 0 does not block any tags and 100 percent of the link bandwidth is available to a particular source. Programming a code of one will block valid tags for one maximum time frame out of 16 maximum frame time base. Programmed code 1 will have a maximum transfer rate of 15 out of 16 (i.e., 93.75%). Hence each time QOS 503 value is increased there is a 6.25% decrease in the maximum transfer rate of a source port.

Threshold value 503A is compared by logic 504 with counter value 512. If counter value 512 is greater than or equal to QOS register value 503A, then the frame is sent. If the counter value 512 is less than QOS register value 503A then a "block TTAG" signal 509 is generated that blocks frame transmission from the port, as discussed above.

By using a programmed value, each source port will not achieve its maximum transfer rate, if the sum of the programmed rates is greater than the capacity of the transmit port. Hence, QOS register value 503A ensures that a specific source port will not exceed its programmed maximum transfer rate.

It is noteworthy that the foregoing example of 16 frames times is provided to illustrate the adaptive aspect of the present invention and is not intended to limit the invention to any particular number of maximum frame time base.

Figure 6:
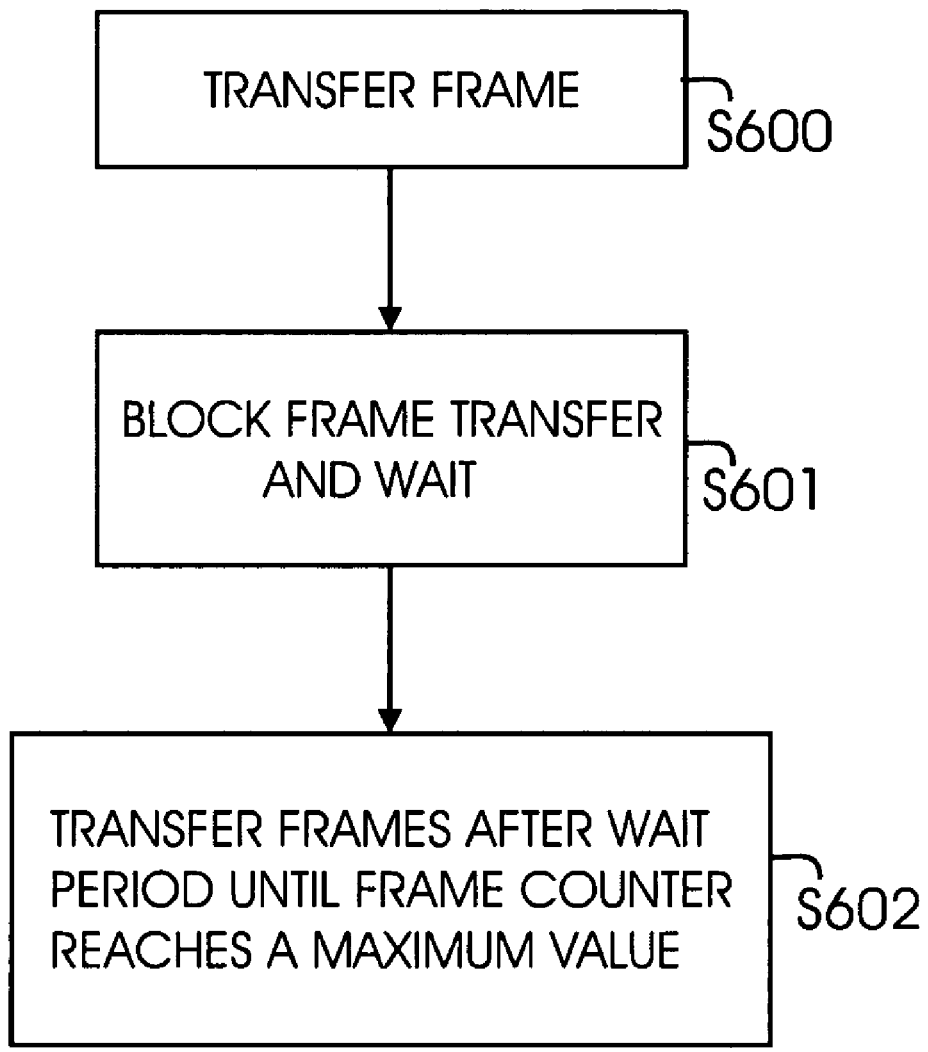
FIG. 6 shows a flow diagram of executable steps for using bandwidth limitation as a parameter to avoid frame congestion in a fibre channel switch, according to one aspect of the present invention.

FIG. 6 shows a flow diagram for transferring frames from a fibre channel switch element, according to one aspect of the present invention.

In step S600, one frame is first transferred from a source port. In step S601, after the frame transfer is complete, tag valid from the source port is blocked using logic 500. The tag valid is blocked based on programmed value 503A. After the tag valid is blocked, the system waits. During this wait period TARB 331 selects no frames from the blocked source for transfer. TARB 331 may select frames from other non-blocked source ports to transmit.

In step S602, after the wait period the tag valid are passed to TARB 331 for transfer. Frames are transferred until the maximum frame counter 502 counts until X (or 15 in the foregoing example). Thereafter, the entire process repeats.

Turning again to the example of FIG. 2, because frames can be blocked based on the overall bandwidth, the frame transfer rate for host 202 is reduced so that the buffers in port 205 are evenly distributed for targets 207 and 208. This reduces overall congestion.

Although the present invention has been described with reference to specific embodiments, these embodiments are illustrative only and not limiting. Many other applications and embodiments of the present invention will be apparent in light of this disclosure and the following claims.

What is claimed is:

1. A method for optimizing bandwidth allocation in a fibre channel network having a fibre channel switch element, comprising:

enabling a first bandwidth limitation counter in bandwidth limiting logic, the first bandwidth limitation counter being configured to measure a first duration corresponding to an amount of time to pass a full-length frame;

enabling a second bandwidth limitation counter in the bandwidth limiting logic, the second bandwidth limitation counter being configured to count from zero to a threshold value x;

sending a frame from a source port and generating a frame depart signal denoting that the source port has completed transfer of the frame;

the second bandwidth limitation counter, upon receiving the frame depart signal, counting an interval from zero to x;

wherein a signal from the first bandwidth limitation counter increments the second bandwidth limitation counter; and during the interval frame transmission from the source port is blocked but other source ports may be chosen for frame transmission.

2. The method of claim 1, wherein blocking frame transmission from the source port comprises blocking a valid bit in a transmit tag register of the bandwidth limiting logic.

3. The method of claim 1, further comprising the step of programming the value of x in a quality of service register.

4. The method of claim 1 further comprising a transmit credit signal stopping the first bandwidth limitation counter from counting when no transmit credit is available.

5. The method of claim 1, further comprising the second bandwidth limitation counter receiving a bandwidth limiting enable signal to enable bandwidth limiting.

6. Bandwidth limiting logic in a transmit segment of a fibre channel switch element, comprising:

a first bandwidth limitation counter configured to measure a first duration corresponding to an amount of time to pass a full-length frame; and a second bandwidth limitation counter configured to count an interval from zero to a threshold value x upon receiving a frame depart signal denoting that a source port has completed transfer of a frame, and during the interval frame transmission from the source port is blocked but other source ports may be chosen for frame transmission;

wherein the first bandwidth limitation counter is configured to generate a signal that increments the second bandwidth limitation counter.

7. The bandwidth limiting logic of claim 6, wherein during the interval the transmit segment may select another source port for frame transmission.

8. The bandwidth limiting logic of claim 6, further comprising a programmable register configured to store the programmable threshold value x.

9. The bandwidth limiting logic of claim 6, wherein a value of the second bandwidth limitation counter is compared to the threshold value x to determine whether the source port should be blocked.

10. The bandwidth limiting logic of claim 6, further comprising a transmit credit signal configured to stop the first bandwidth limitation counter from counting when no transmit credit is available.

11. The bandwidth limiting logic of claim 6, further comprising a bandwidth limiting enable signal configured to enable bandwidth limiting.

* * * * *

UNITED STATES PATENT AND TRADEMARK OFFICE
CERTIFICATE OF CORRECTION

PATENT NO. : 7,512,067 B2  Page 1 of 1
APPLICATION NO. : 10/894536
DATED : March 31, 2009
INVENTOR(S) : Frank R. Dropps et al.

It is certified that error appears in the above-identified patent and that said Letters Patent is hereby corrected as shown below:

On the Title Pg, Item (57), under "Abstract", line 2, delete "fiber" and insert -- fibre --, therefor.

On the Title Pg, Item (57), under "Abstract", line 2, delete "fiber" and insert -- fibre --, therefor.

On the Title Pg, Item (56), on page 4, under "Other Publications", line 40, delete "Virual" and insert -- Virtual --, therefor.

Signed and Sealed this

Twelfth Day of October, 2010

David J. Kappos
*Director of the United States Patent and Trademark Office*